(12) United States Patent
Kitagawa et al.

(10) Patent No.: US 11,958,160 B2
(45) Date of Patent: Apr. 16, 2024

(54) METHOD FOR SLICING WORKPIECE AND WIRE SAW

(71) Applicant: SHIN-ETSU HANDOTAI CO., LTD., Tokyo (JP)

(72) Inventors: Koji Kitagawa, Nishigo-mura (JP); Shiro Toyoda, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 938 days.

(21) Appl. No.: 16/963,972

(22) PCT Filed: Nov. 26, 2018

(86) PCT No.: PCT/JP2018/043315
§ 371 (c)(1),
(2) Date: Jul. 22, 2020

(87) PCT Pub. No.: WO2019/142494
PCT Pub. Date: Jul. 25, 2019

(65) Prior Publication Data
US 2021/0016413 A1    Jan. 21, 2021

(30) Foreign Application Priority Data

Jan. 22, 2018  (JP) .................................. 2018-008110

(51) Int. Cl.
*B24B 55/02*     (2006.01)
*B23D 57/00*     (2006.01)
(Continued)

(52) U.S. Cl.
CPC ...... *B24B 27/0633* (2013.01); *B23D 57/0007* (2013.01); *B23D 61/18* (2013.01);
(Continued)

(58) Field of Classification Search
CPC ... B24B 27/0633; B24B 41/005; B24B 55/02; B24B 55/03; B28D 5/04; B28D 5/042;
(Continued)

(56) References Cited

U.S. PATENT DOCUMENTS

| | | | | |
|---|---|---|---|---|
| 5,678,466 A | * | 10/1997 | Wahl ................. | B23Q 11/1046 83/171 |
| 2002/0115390 A1 | * | 8/2002 | Kondo ................. | B28D 5/0076 125/16.02 |

(Continued)

FOREIGN PATENT DOCUMENTS

| | | |
|---|---|---|
| EP | 2 602 058 A1 | 6/2013 |
| JP | 2003-191158 A | 7/2003 |

(Continued)

OTHER PUBLICATIONS

Feb. 19, 2019 International Search Report issued in International Patent Application No. PCT/JP2018/043315.

(Continued)

*Primary Examiner* — Eileen P Morgan
(74) *Attorney, Agent, or Firm* — Oliff PLC

(57) ABSTRACT

A method for slicing a workpiece with a wire saw which includes a wire row formed by winding a fixed abrasive grain wire having abrasive grains secured to a surface thereof around multiple grooved rollers, the method including feeding a workpiece to the wire row for slicing while allowing the fixed abrasive grain wire to reciprocatively travel in an axial direction thereof, thereby slicing the workpiece at multiple positions aligned in an axial direction of the workpiece simultaneously. The method includes: supplying a coolant for workpiece slicing onto the wire row when the workpiece is sliced with the fixed abrasive grain wire; and supplying a coolant for workpiece drawing, which differs from and has a higher viscosity than the coolant for workpiece slicing, onto the wire row when the workpiece is (Continued)

drawn out from the wire row after the slicing of the workpiece.

9 Claims, 2 Drawing Sheets

(51) Int. Cl.
*B23D 59/04* (2006.01)
*B23D 61/18* (2006.01)
*B24B 27/06* (2006.01)
*B24B 41/00* (2006.01)
*B28D 5/00* (2006.01)
*B28D 5/04* (2006.01)
*B28D 7/02* (2006.01)

(52) U.S. Cl.
CPC ............ *B24B 41/005* (2013.01); *B24B 55/02* (2013.01); *B28D 5/0076* (2013.01); *B28D 5/04* (2013.01); *B28D 5/042* (2013.01); *B28D 5/045* (2013.01); *B28D 7/02* (2013.01)

(58) Field of Classification Search
CPC .... B28D 5/045; B28D 5/0076; B28D 5/0082; B28D 7/02; B23D 57/0007; B23D 57/0023; B23D 57/003; B23D 59/02; B23D 59/04; B23D 61/18
USPC .............. 125/16.01, 16.02, 21; 451/449, 450
See application file for complete search history.

(56) References Cited

U.S. PATENT DOCUMENTS

| | | | | |
|---|---|---|---|---|
| 2004/0255924 | A1* | 12/2004 | Kondo | ................... B28D 5/045 125/41 |
| 2012/0192848 | A1* | 8/2012 | Nakashima | ............. B24B 55/02 125/21 |
| 2013/0236386 | A1* | 9/2013 | Seelmann-Eggebert | .................... B28D 5/0076 568/624 |
| 2014/0145309 | A1* | 5/2014 | Grabbe | ................... F28F 19/01 210/195.1 |
| 2018/0281147 | A1 | 10/2018 | Kitagawa et al. | |

FOREIGN PATENT DOCUMENTS

| | | |
|---|---|---|
| JP | 2011-020197 A | 2/2011 |
| JP | 2011-082351 A | 4/2011 |
| JP | 2012-035336 A | 2/2012 |
| JP | 2014-009413 A | 1/2014 |
| JP | 2017-077594 A | 4/2017 |

OTHER PUBLICATIONS

Sep. 12, 2023 Office Action issued in Korean Patent Application No. 10-2020-7019214.

* cited by examiner

[FIG. 1]
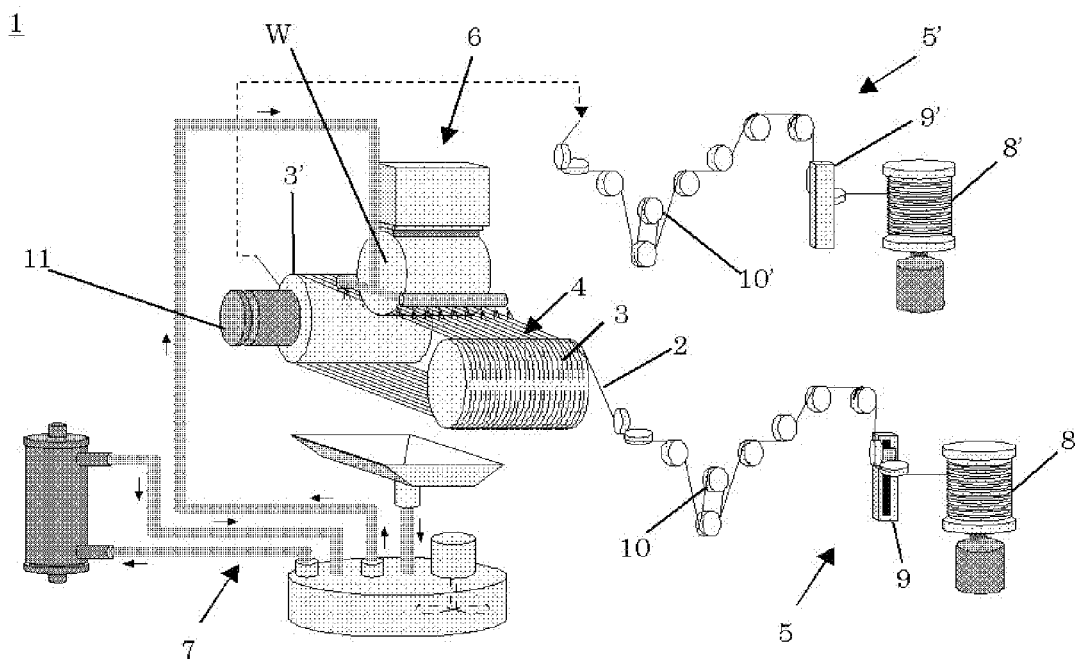
[FIG. 2]
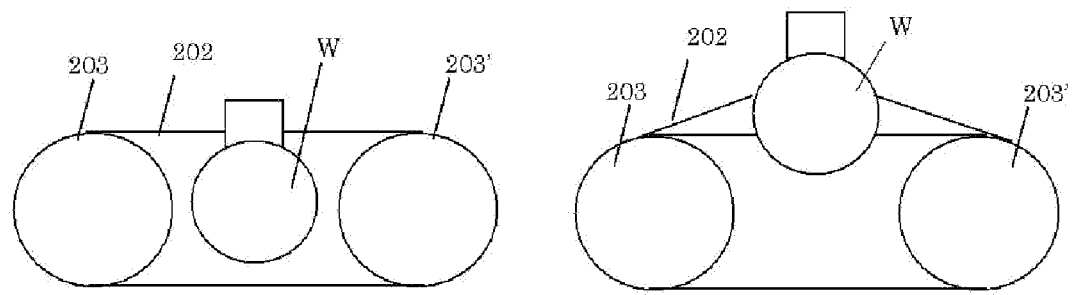
(a) AT END OF SLICING
(b) AT OCCURRENCE OF CATCH
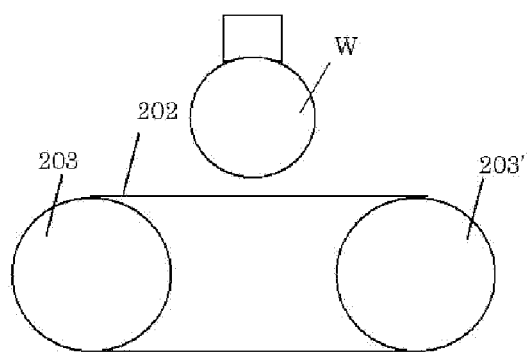
(c) AT END OF DRAWING-OUT

[FIG. 3]
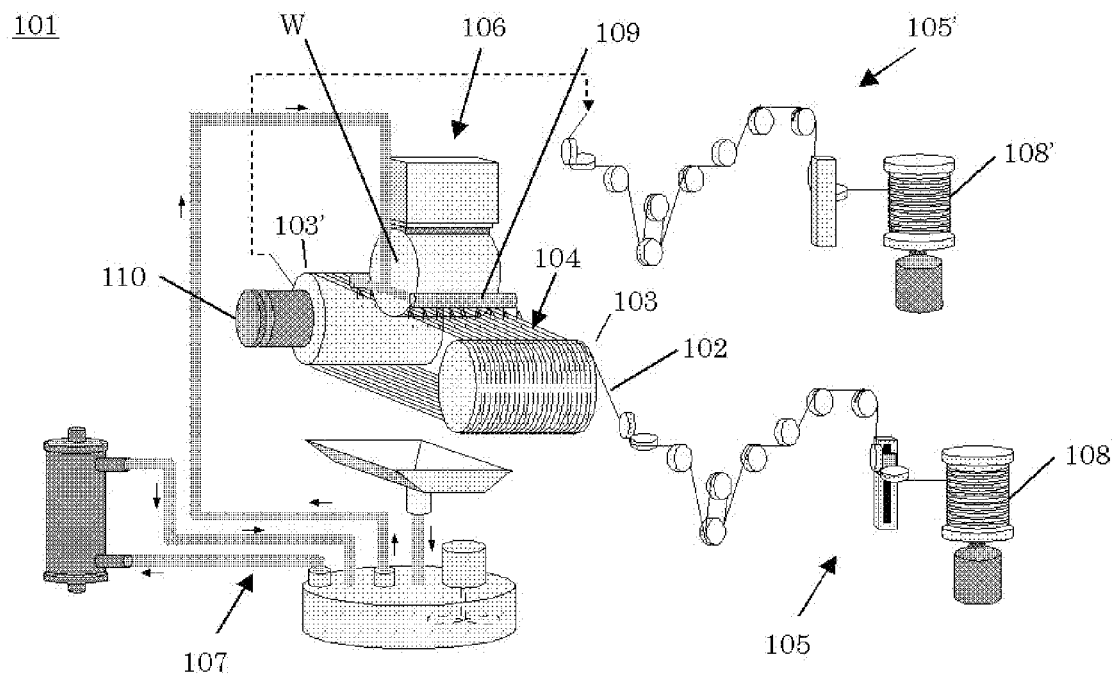
[FIG. 4]
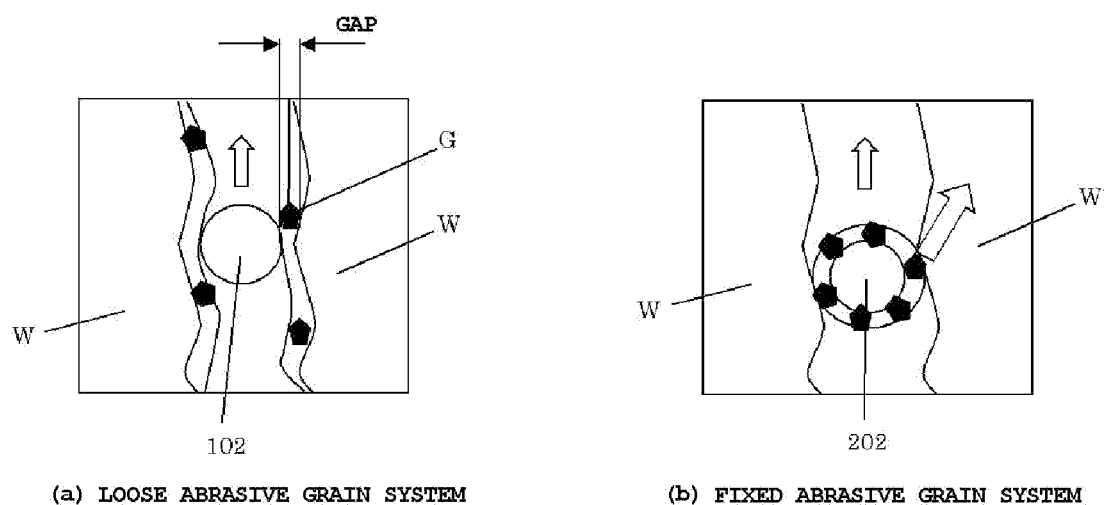
(a) LOOSE ABRASIVE GRAIN SYSTEM
(b) FIXED ABRASIVE GRAIN SYSTEM

METHOD FOR SLICING WORKPIECE AND WIRE SAW

TECHNICAL FIELD

The present invention relates to a method for slicing a workpiece and a wire saw.

BACKGROUND ART

As means for slicing off wafers from a workpiece such as, for example, a silicon ingot or a compound semi conductor ingot, wire saws have been conventionally known. In such a wire saw, a wire row is formed by winding a slicing wire around multiple rollers in many turns, the slicing wire is driven in an axial direction thereof at a high speed, and a workpiece is fed to the wire row for slicing, while a slurry or coolant is being supplied appropriately, whereby this workpiece is sliced at wire positions simultaneously (see, for example, Patent Document 1).

Here, FIG. 3 shows an outline of an example of a conventional general wire saw.

As shown in FIG. 3, this wire saw 101 is mainly constituted of a wire 102 (high tensile steel wire) for slicing a workpiece W a wire row 104 formed by winding the wire 102 around multiple grooved rollers 103 and 103', mechanism 105 and 105' for imparting tension to the wire 102, a workpiece-feeding mechanism 106 for feeding the workpiece W to be sliced downward, and a mechanism 107 for supplying a slurry having GC (silicon carbide) abrasive grains or the like dispersed in a liquid during the slicing.

The wire 102 is reeled out from one wire reel 108, and reaches the grooved roller 103 through the tension-imparting mechanism 105. The wire 102 is wound around this grooved rollers 103 in approximately 300 to 400 turns, and then taken up by a wire reel 108' through the other tension-imparting mechanism 105'.

Further, the grooved roller 103 is a roller provided by press-filling a polyurethane resin around a cylinder made of steel and forming grooves on a surface thereof at a fixed pitch. The grooved roller 103 is configured such that the wound wire 102 can be driven in reciprocating directions in a predetermined cycle by a driving motor 110.

Note that, when the workpiece W is sliced, the workpiece Wis held and pushed down by the workpiece-feeding mechanism 106, and fed to the wire 102 wound around the grooved rollers 103. Such a wire saw 101 is used to apply appropriate tension to the wire 102 with the wire tension-imparting mechanism 105, the slurry is supplied through nozzles 109 while the wire 102 travels in the reciprocating directions by the driving motor 110, and the workpiece is fed for slicing by the workpiece-feeding mechanism 106, thereby slicing the workpiece.

On the other hand, there is also known a method for slicing a workpiece by using a fixed abrasive grain wire which has diamond abrasive grains or the like secured to a surface of the wire, instead of using slurry containing abrasive grains. This has been partially put into practical use for slicing small-diameter ingots with diameters of approximately 150 mm or less.

In this slicing using the fixed abrasive grain wire, the wire saw shown in FIG. 3 can be used as it is by attaching the fixed abrasive grain wire in place of the steel wire of the ware saw and changing the slurry to a coolant which does not contain abrasive grains.

CITATION LIST

Patent Literature

Patent Document 1: Japanese Unexamined Patent Application Publication No. 2011-20197

SUMMARY OF INVENTION

Technical Problem

Slicing with the fixed abrasive grain wire has many merits that since loose abrasive grains are not used, the amount of industrial waste is small in environmental aspects, and the processing rate is high, in comparison with processing with a wire saw utilizing loose abrasive grains. However, in the wire saw as shown in FIG. 3, since the workpiece W is pressed against the one wire 102 wound around the grooved rollers 103, moved, and sliced, the workpiece Wis placed on a lower side of the wire 102 at the end of slicing. To take out the workpiece W, the sliced workpiece W needs to be drawn out by moving up the workpiece W such that the wire 102 passes through gaps between wafers sliced off from the workpiece W, and is then extracted relatively downward.

At the time of drawing out the sliced workpiece W, in case of the wire saw using loose abrasive grains as shown in FIG. 4(a), a gap (clearance) corresponding to a width of each loose abrasive grain G is formed between the wire 102 and the workpiece W. Further, the loose abrasive grains contained in the slurry remaining on the workpiece surface roll and thereby reduce friction resistance. Hence, extraction of the wire 102 is relatively easy. However, in case of the wire saw using fixed abrasive grains as shown in FIG. 4(b), a narrower clearance is formed between the fixed abrasive grain wire 202 and the workpiece W than that in the wire saw using loose abrasive grains. Further, no rolling loose abrasive grains exist, either. Hence, the fixed abrasive grain wire 202 is hard to be drawn out, and the fixed abrasive grain wire 202 is caught by the workpiece W and rises. If the fixed abrasive grain wire 202 is drawn out in this state, a workpiece cut section is damaged, what is called saw nark is readily formed on the cut section, and thereby Warp is degraded to impair quality. Furthermore, when the rise of the wire increases, the wire nay be disconnected. When the wire is disconnected, an operation to re-wind the fixed abrasive grain wire around the grooved rollers is required, resulting in great loss due to, for example, a need for an extra length of the fixed abrasive grain wire for the re-winding.

The present invention has been made in view of the above-described problem. An object of the present invention is to provide a method for slicing a workpiece and a wire saw which inhibit a sliced workpiece from catching a fixed abrasive grain ware and from causing saw mark and wire disconnection in drawing out the workpiece from a wire row formed of the wire.

Solution to Problem

To achieve the object, the present invention provides a method for slicing a workpiece with a wire saw which includes a wire row formed by winding a fixed abrasive grain wire having abrasive grains secured to a surface thereof around a plurality of grooved rollers, the method comprising feeding a workpiece to the wire row for slicing while allowing the fixed abrasive grain wire to reciprocatively travel in an axial direction thereof, thereby slicing the workpiece at a plurality of positions aligned in an axial direction of the workpiece simultaneously, wherein the method comprises:

supplying a coolant for workpiece slicing onto the wire row when the workpiece is being sliced with the fixed abrasive grain wire; and supplying a coolant for workpiece drawing, which is different from the coolant for workpiece slicing and has a higher viscosity than the coolant for workpiece slicing, onto the wire row when the workpiece is drawn out from the wire row after the slicing of the workpiece.

Such a method makes it possible to inhibit the sliced workpiece from catching the fixed abrasive grain wire and causing saw mark and wire disconnection when the workpiece is drawn out from the wire row formed of the wire.

Moreover, in this event, it is preferable to use the coolant for workpiece slicing having a viscosity at 25éC. of 5 mPas or less, and the coolant for workpiece drawing having a viscosity at 25° C. of 15 mPas or more.

In this manner, the uses of the coolant for workpiece slicing having the aforementioned viscosity during the slicing of the workpiece and the coolant for workpiece drawing having the aforementioned viscosity during the drawing of the workpiece prevent degradation of slicing quality, particularly Warp, and enable more reliable inhibition of saw mark and wire disconnection.

Further, in this event, it is preferable to use the coolant for workpiece slicing having a water content of 99 mass % or more, and the coolant for workpiece drawing having a water content of 90 mass % or less.

The coolants with such water contents are suitable as the coolant for workpiece slicing and the coolant for workpiece drawing used in the present invention.

Additionally, in this event, the workpiece to be sliced may have a diameter of 300 nm or more.

The inventive method for slicing a workpiece is particularly effective when a workpiece having a large diameter is sliced.

Moreover, the present invention provides a wire saw comprising:

a wire row formed of a fixed abrasive grain wire which has abrasive grains secured to a surface thereof and is wound around a plurality of grooved rollers;

a workpiece-feeding mechanism configured to press a workpiece against the wire row while holding the workpiece; and a coolant-supplying mechanism configured to supply a coolant onto the wire row, wherein the workpiece-feeding mechanism feeds the workpiece for slicing to the wire row to which a coolant is being supplied by the cool anti-supplying mechanism while the fixed abrasive grain wire reciprocatively travels in an axial direction thereof, thereby slicing the workpiece at a plurality of positions aligned in an axial direction of the workpiece simultaneously, wherein the coolant-supplying mechanism supplies a coolant for workpiece slicing onto the wire row when the workpiece is being sliced with the fixed abrasive grain wire, and supplies a coolant for workpiece drawing, which is different from the coolant for workpiece slicing and has a higher viscosity than the coolant for workpiece slicing, onto the wire row when the workpiece is drawn out from the wire row after the slicing of the workpiece.

The inventive wire saw supplies a coolant for workpiece drawing, which is different from the coolant for workpiece slicing and has a higher viscosity than the coolant for workpiece slicing, onto the wire row during the drawing of the workpiece from the wire row after the slicing of the workpiece. This makes it possible to inhibit the sliced workpiece from catching the wire and from causing saw mark and wire disconnection.

ADVANTAGEOUS EFFECTS OF INVENTION

As described above, according to the inventive method for slicing a workpiece and wire saw, in the wire saw using a fixed abrasive grain wire, a coolant for workpiece drawing having a higher viscosity than a coolant for workpiece slicing is supplied when a workpiece is drawn out after the workpiece is sliced. This makes it possible to inhibit the sliced workpiece from catching the wire and from causing saw mark and wire disconnection.

BRIEF DESCRIPTION OF DRAWINGS

FIG. 1 is a schematic drawing showing an example of a wire saw according to the present invention.

FIG. 2(*a*) is a drawing showing a positional relationship between a workpiece and a fixed abrasive grain wire after the end of slicing the workpiece, (*b*) is a drawing showing a state of the workpiece and the fixed abrasive grain wire when a catch of the wire has occurred, and (*c*) is a drawing showing a positional relationship between the workpiece and the fixed abrasive grain wire after the end of drawing out the workpiece.

FIG. 3 is a schematic drawing showing an example of a conventional general wire saw.

FIG. 4(*a*) is a drawing showing a state of a wire in a gap of workpieces in a loose abrasive grain system and (*b*) is a drawing showing a state of a fixed abrasive grain wire in a gap of workpieces in a fixed abrasive grain system.

DESCRIPTION OF EMBODIMENTS

As described above, in slicing a workpiece by using a fixed abrasive grain wire, there are problem that when the sliced workpiece is drawn out from a wire row after the end of slicing the workpiece, the wire is caught by the sliced workpiece, so that saw marks are formed on the cut sections and the wire is disconnected.

Thus, the present inventors have repeatedly conducted the earnest examination to solve such problem. Consequently, the inventors have found that after workpiece slicing, when the sliced workpiece is drawn out from a wire row, supplying a coolant for workpiece drawing having a higher viscosity than a coolant for workpiece slicing onto the wire row improves the lubricity on the workpiece cut sections during the workpiece drawing, thereby successfully inhibiting the sliced workpiece from catching the wire and from causing saw mark and wire disconnection. This finding has brought the present invention to completion.

Hereinafter, embodiments of the present invention will be described, but the present invention is not limited thereto.

FIG. 1 is a schematic drawing showing an example of a wire saw 1 according to the present invention. As shown in FIG. 1, the inventive wire saw 1 is mainly constituted of: a fixed abrasive grain wire 2 configured to slice a workpiece W multiple grooved rollers 3, 3' around which the fixed abrasive grain wire 2 is wound; a wire row 4 formed of the fixed abrasive grain wire 2 wound around the grooved rollers 3, 3'; tension-imparting mechanisms 5, 5' configured to import tension to the fixed abrasive grain wire 2; a workpiece-feeding mechanism 6 configured to feed the workpiece W to be sliced downward; and a coolant-supplying mechanism 7 configured to supply a coolant during slicing and drawing of the workpiece.

Here, reeling-out and taking-up of the fixed abrasive grain wire will be described in more detail. The fixed abrasive grain wire 2 is reeled out from one wire reel 8, passes through the tension-imparting mechanism 5 including a powder clutch (low-torque motor 10), a dancer roller (dead weight) (not shown), and so forth via a traverser 9, and reaches the grooved roller 3. Further, the fixed abrasive grain wire 2 is wound around the grooved rollers 3 and 3' in approximately 400 to 500 turns, thereby forming the wire row 4. Furthermore, the fixed abrasive grain wire 2 passes through the other tension-imparting mechanism 5' including a powder clutch (low-torque motor 10') and a dancer roller (dead weight) (not shown), and taken up by a wire reel 8' via a traverser 9'.

Such a wire saw 1 slices the workpiece W at multiple positions aligned in an axial direction of the workpiece W simultaneously when the workpiece-feeding mechanism 6 feeds the workpiece W for slicing to the wire row 4 to which a coolant is being supplied by the coolant-supplying mechanism 7 while the fixed abrasive grain wire 2 reciprocatively travels in an axial direction thereof. The fixed abrasive grain wire 2 is configured to reciprocatively travel such that the fixed abrasive grain wire 2 wound between the multiple grooved rollers 3, 3' is advanced in one direction by a predetermined length and then retreated in the other direction by a length shorter than the aforementioned advancing amount. This is determined as one feed cycle, and the fixed abrasive grain wire 2 is fed out in one direction by repeating this cycle. The grooved roller 3' is configured to drive the fixed abrasive grain wire 2 wound there around in reciprocating directions by using a driving motor 11 in a predetermined period.

FIGS. 2(*a*) and (*c*) are drawings each showing a positional relationship between the workpiece W and the fixed abrasive grain wire 202 at the end of slicing the workpiece or at the end of drawing out the workpiece. As shown in FIG. 2(*a*), at the end of slicing, the workpiece W is located below the wire row. Thus, to take out the workpiece W the fixed abrasive grain wire 202 needs to be relatively drawn out downward by moving up the workpiece W such that the fixed abrasive grain wire 202 passes through gaps between wafers of the workpiece W which has been sliced into the wafers (FIG. 2(*c*)).

However, in case of the conventional wire saw using fixed abrasive grains, the clearance between the fixed abrasive grain wire 202 and the workpiece W is so small (see FIG. 4(*b*)) that the fixed abrasive grain wire 202 is caught by the workpiece W and rises as shown in FIG. 2(*b*). Consequently, saw mark is formed on a cut section of the workpiece W or the wire is disconnected.

As an example, the clearance between a wire and the workpiece W is approximately 25 μm or more in a loose abrasive grain system but approximately 6 μm or less in a fixed abrasive grain system To avoid saw mark formation and wire disconnection, the inventive wire saw 1 includes the coolant-supplying mechanism 7 which supplies a coolant for workpiece slicing onto the wire row 4 when the workpiece is being sliced with the fixed abrasive grain wire 2, and supplies a coolant for workpiece drawing, which is different from the coolant for workpiece slicing and has a higher viscosity than the coolant for workpiece slicing, onto the wire row 4 when the workpiece W is drawn out from the wire row 4 after the slicing of the workpiece W.

In this manner, in the inventive wire saw 1, a coolant for workpiece drawing having a higher viscosity than a coolant for workpiece slicing is supplied when a workpiece is drawn out after the workpiece slicing. This enhances the lubricity on workpiece cut sections, making it possible to inhibit the workpiece from catching the wire and causing earmark and wire disconnection. Particularly, when a workpiece is drawn out after the workpiece slicing, the wire traveling rate is preferably 1/100 of that when the workpiece is sliced or even slower to avoid earmark formation by the wire which comes into contact with a workpiece cut section. For this reason, if the same coolant as that for workpiece slicing is supplied onto the wire row, the amount of the coolant supplied to the workpiece cut sections is decreased due to the lower wire traveling rate, so that the lubricity on workpiece cut sections is significantly decreased. Nevertheless, this can be prevented according to the inventive wire saw 1 by supplying a coolant for workpiece drawing having a higher viscosity than a coolant for workpiece slicing when a workpiece is drawn out.

Next, a method for slicing a workpiece according to the present invention will be described based on an example where the above-described inventive wire saw is used.

First, as shown in FIG. 1, the fixed abrasive grain wire 2 having abrasive grains secured to the surface is wound around the multiple grooved rollers 3, 3' to form the wire row 4. Then, the fixed abrasive grain wire 2 is allowed to reciprocatively travel in the axial direction of the fixed abrasive grain wire 2 by the driving motor 11. Further, the columnar workpiece W is fed to the wire row 4 for slicing by the workpiece-feeding mechanism 6, and thereby the workpiece W is sliced at multiple positions aligned in the axial direction thereof simultaneously.

In the inventive method for slicing a workpiece, a coolant for workpiece slicing is supplied onto the wire row 4 when the workpiece is being sliced with the fixed abrasive grain wire 2, and a coolant for workpiece drawing, which is different from the coolant for workpiece slicing and has a higher viscosity than the coolant for workpiece slicing, is supplied onto the wire row 4 when the workpiece W is drawn out from the wire row 4 after the slicing of the workpiece.

This makes it possible to inhibit the sliced workpiece from catching the wire, saw mark formation on the sliced section, and wire disconnection when the workpiece W is drawn out.

The coolant for workpiece slicing preferably has a viscosity of 5 mPas or less at 25° C. Note that the lower limit of the viscosity at 25° C. of the coolant for workpiece slicing is not particularly limited. Nevertheless, since the coolant for workpiece slicing contains water in an amount of 99 mass % or more as described below, the viscosity is higher than 0.89 mPas, which is the viscosity of water. Meanwhile, the coolant for workpiece drawing preferably has a viscosity of 10 mPas or more at 25° C., more preferably 15 mPas or more, further preferably 20 mPas or more. Nonetheless, if the viscosity is too high, it becomes difficult to handle the coolant for workpiece drawing. Hence, the viscosity is preferably 500 mPas or less.

Moreover, the content of water contained in the coolant for workpiece slicing is preferably 99 mass % or more, while the content of water contained in the coolant for workpiece drawing is preferably 90 mass % or less. Note that the lower limit of the content of water contained in the coolant for workpiece drawing is not particularly limited, but can be 70 mass % or more.

The larger the amount of water contained in the coolant supplied during the workpiece slicing (coolant for workpiece slicing), the higher the cooling effect on the cutting area, so that favorable Warp quality is more easily obtained. Nevertheless, since the material of the portion in contact with the coolant in the wire saw apparatus is generally an alloy mainly containing iron such as carbon steel or Invar material, the coolant preferably contains a component for preventing rust formation, which is called anti-rust. Thus, the content of water contained in the coolant for workpiece slicing is preferably less than 100 mass % Further, since cutting chips generated by slicing the workpiece may be incorporated into the coolant for workpiece slicing, a dispersant is preferably added to prevent cutting chips from firmly attaching in a coolant-supply path, or a pH adjuster is preferably added to prevent hydrogen generation by reaction between water and silicon in cutting chips. Moreover, to prevent bubble formation in a coolant-circulation supply tank, a defoamer is preferably added. The total amount of such additives as described above is preferably approximately 1 mass % or less.

When the workpiece is sliced, the coolant for workpiece slicing having the optimum physical properties (viscosity) for workpiece slicing as described above is supplied, so that favorable Warp quality can be obtained without increasing the cutting resistance at the cutting area, which would otherwise occur if a high-viscosity coolant for workpiece slicing is used, without increasing the workpiece temperature due to cutting resistance, and without degrading slicing quality, particularly Warp.

Meanwhile, the coolant supplied during the workpiece drawing (coolant for workpiece drawing) has a viscosity at 25° C. of preferably 10 mPas or more, more preferably 15 mPas or more, further preferably 20 mPas or more. The use of the coolant for workpiece drawing having such a viscosity can improve the lubricity on workpiece cut sections. To achieve such a viscosity, the amount of water contained in the coolant for workpiece drawing can be set to 90 mass % or less, and a component having a thickening action can be added as the retraining component in an amount of 10 mass % or more.

Furthermore, the workpiece to be sliced preferably has a diameter of 300 nm or more. As the size of the workpiece increases, the length of the fixed abrasive grain wire which abuts on the workpiece and the distance to draw out the workpiece become longer, and the fixed abrasive grain wire is more readily caught. In such situations, the inventive slicing method is particularly effective means.

EXAMPLE

Hereinafter, the present invention will be specifically described with reference to Examples and Comparative Example, but the present invention is not limited thereof.

Examples 1 to 4

The inventive wire saw as shown in FIG. 1 was used to thoroughly slice a workpiece and then the workpiece was drawn out from the wire row. When the workpiece was drawn out, a coolant to be supplied was changed in accordance with the inventive slicing method. Multiple workpieces were sliced to evaluate the frequency of disconnections during the drawing of the workpieces. Note that one illustrated in Table 1 below was used as the fixed abrasive grain wire. Table 2 below shows the workpiece slicing conditions and drawing conditions. Additionally, the viscosity at 25° C. of each coolant was measured using a digital viscometer (manufactured by Toki Sangyo Co., Ltd., model TVB-10). Table 3 below shows the result.

COMPARATIVE EXAMPLE

Multiple workpieces were sliced as in Examples, except that a coolant having the same viscosity as that of the coolant for workpiece slicing was used as the coolant for workpiece drawing. The frequency of disconnections during the drawing of the workpieces was evaluated. Table 3 below shows the result.

TABLE 1

| | |
|---|---|
| Core wire diameter | 0.140 mm |
| Diamond abrasive grain | 10 to 20 i m |
| Wire outer diameter (nominal) | 0.174 mm |
| Abrasive grain fixing method | Electrodeposition of nickel |

TABLE 2

| | | Slicing conditions |
|---|---|---|
| Workpiece | Diameter | 301 mm |
| | Length | 300 mm |
| Wire travelling conditions during workpiece slicing | Wire tension | 25N |
| | Wire travelling rate | up to 1500 m/min |
| | Wire advancing amount | 2114 m |
| | Wire retreating amount | 2086 m |
| | Amount of wire used | 9000 m |
| Workpiece feeding conditions during workpiece slicing | Workpiece feeding rate | 0.32 mm/min on average |
| Wire travelling conditions during drawing | Wire tension | 25N |
| | Wire travelling rate | up to 5 m/min |
| | Wire advancing amount | 1 m |
| | Wire retreating amount | 1 m |
| Workpiece feeding condition during drawing | Workpiece feeding rate | 60 mm/min on average |
| Coolant for slicing | Coolant flow rate | about 150 L/min |
| | Coolant temperature | 25 éC. |
| | Viscosity | 5 mPas |
| | Water amount | 99 wt % |
| Coolant for drawing | Coolant flow rate | about 150 L/min |
| | Coolant temperature | 25 éC. |
| | Viscosity | 5/10/15/20/25 mPas |
| | Water amount | 99/95/90/85/80 wt % |

TABLE 3

| | Coolant for slicing | | Coolant for drawing | | |
|---|---|---|---|---|---|
| | Viscosity mPas | Water amount mass % | Viscosity mPas | Water amount mass % | Disconnection frequency |
| Comparative Example | 5 | 99 | 5 | 99 | Poor |

TABLE 3-continued

|  | Coolant for slicing | | Coolant for drawing | | |
|---|---|---|---|---|---|
|  | Viscosity mPas | Water amount mass % | Viscosity mPas | Water amount mass % | Disconnection frequency |
| Example 1 |  |  | 10 | 95 | Good |
| Example 2 |  |  | 15 | 90 | Excellent |
| Example 3 |  |  | 20 | 85 | Excellent |
| Example 4 |  |  | 25 | 80 | Excellent |

Poor: disconnections occurred in slicing all the workpieces

Good: disconnections rarely occurred in slicing the workpieces

Excellent: no disconnection occurred in slicing all the workpieces

As shown in Table 3, in Comparative Example where the coolant having the same viscosity as that of the coolant for workpiece slicing was used as the coolant for workpiece drawing, the wire was caught, lifted, and then disconnected when any workpiece was sliced. In contrast, in Examples 1 to 4 where coolants having higher viscosities than that of the coolant for slicing workpiece were used as the coolants for workpiece drawing, the rise of the wire was inhibited, and the disconnection was inhibited in comparison with Comparative Example.

It should be noted that the present invention is not limited to the above-described embodiments. The embodiments are just examples, and any examples that have substantially the sane feature and demonstrate the sane functions and effects as those in the technical concept disclosed in claims of the present invention are included in the technical scope of the present invention.

The invention claimed is:

1. A method for slicing a workpiece with a wire saw which includes a wire row formed by winding a fixed abrasive grain wire having abrasive grains secured to a surface thereof around a plurality of grooved rollers, the method comprising feeding a workpiece to the wire row for slicing while allowing the fixed abrasive grain wire to reciprocatively travel in an axial direction thereof, thereby slicing the workpiece at a plurality of positions aligned in an axial direction of the workpiece simultaneously,
wherein the method comprises:
supplying a coolant for workpiece slicing onto the wire row when the workpiece is being sliced with the fixed abrasive grain wire; and
supplying a coolant for workpiece drawing, which is different from the coolant for workpiece slicing and has a higher viscosity than the coolant for workpiece slicing, onto the wire row when the workpiece is drawn out from the wire row after the slicing of the workpiece.

2. The method for slicing a workpiece according to claim 1, wherein
the coolant for workpiece slicing to be used has a viscosity at 25° C. of 5 mPas or less, and
the coolant for workpiece drawing to be used has a viscosity at 25° C. of 15 mPas or more.

3. The method for slicing a workpiece according to claim 1, wherein
the coolant for workpiece slicing to be used has a water content of 99 mass % or more, and
the coolant for workpiece drawing to be used has a water content of 90 mass % or less.

4. The method for slicing a workpiece according to claim 2, wherein
the coolant for workpiece slicing to be used has a water content of 99 mass % or more, and
the coolant for workpiece drawing to be used has a water content of 90 mass % or less.

5. The method for slicing a workpiece according to claim 1, wherein the workpiece to be sliced has a diameter of 300 mm or more.

6. The method for slicing a workpiece according to claim 2, wherein the workpiece to be sliced has a diameter of 300 mm or more.

7. The method for slicing a workpiece according to claim 3, wherein the workpiece to be sliced has a diameter of 300 mm or more.

8. The method for slicing a workpiece according to claim 4, wherein the workpiece to be sliced has a diameter of 300 mm or more.

9. A wire saw comprising:
a wire row formed of a fixed abrasive grain wire which has abrasive grains secured to a surface thereof and is wound around a plurality of grooved rollers;
a workpiece-feeding mechanism configured to press a workpiece against the wire row while holding the workpiece; and
a coolant-supplying mechanism configured to supply a coolant onto the wire row, wherein
the workpiece-feeding mechanism feeds the workpiece for slicing to the wire row to which a coolant is being supplied by the coolant-supplying mechanism while the fixed abrasive grain wire reciprocatively travels in an axial direction thereof, thereby slicing the workpiece at a plurality of positions aligned in an axial direction of the workpiece simultaneously,
wherein the coolant-supplying mechanism supplies a coolant for workpiece slicing onto the wire row when the workpiece is being sliced with the fixed abrasive grain wire, and supplies a coolant for workpiece drawing, which is different from the coolant for workpiece slicing and has a higher viscosity than the coolant for workpiece slicing, onto the wire row when the workpiece is drawn out from the wire row after the slicing of the workpiece.

* * * * *